United States Patent [19]

Watson

[11] Patent Number: 4,940,550

[45] Date of Patent: Jul. 10, 1990

[54] MULTI-STEP PROCESS FOR CONCENTRATING MAGNETIC PARTICLES IN WASTE SLUDGES

[75] Inventor: John L. Watson, Rolla, Mo.

[73] Assignee: The Curators of the University of Missouri, Columbia, Mo.

[21] Appl. No.: 346,554

[22] Filed: May 2, 1989

[51] Int. Cl.[5] .............................................. B01D 35/06
[52] U.S. Cl. ..................... 210/695; 210/734; 210/770; 210/223; 210/710
[58] Field of Search ............... 210/695, 912, 223, 734, 210/732, 710, 770, 723

[56] References Cited

U.S. PATENT DOCUMENTS

| | | | |
|---|---|---|---|
| 2,125,846 | 8/1938 | Laughlin | 210/695 |
| 2,232,294 | 2/1941 | Urbain et al. | 210/695 |
| 2,232,295 | 2/1941 | Urbain et al. | 210/695 |
| 2,232,296 | 2/1941 | Urbain et al. | 210/695 |
| 2,264,756 | 12/1942 | Johnston, Jr. | 210/695 |
| 3,142,638 | 7/1964 | Blaisdell | 210/695 |
| 3,279,602 | 10/1966 | Kottenstette et al. | 209/214 |
| 3,493,501 | 2/1970 | Eck | 210/734 |
| 3,536,198 | 10/1970 | Bartnik et al. | 210/223 |
| 3,549,527 | 12/1970 | Peck et al. | 210/695 |
| 3,680,698 | 8/1972 | Liu et al. | 210/734 |
| 3,714,037 | 1/1973 | Almasi et al. | 210/695 |
| 3,826,365 | 7/1974 | Mercade | 209/5 |
| 4,110,208 | 8/1978 | Neal | 210/695 |
| 4,148,731 | 10/1979 | Brigante | 210/695 |
| 4,193,866 | 3/1980 | Slusarczuk et al. | 210/695 |
| 4,502,958 | 5/1985 | Sasaki | 210/695 |
| 4,561,953 | 12/1985 | Muralidhara et al. | 204/182.3 |

FOREIGN PATENT DOCUMENTS

| | | | |
|---|---|---|---|
| 2616734 | 10/1976 | Fed. Rep. of Germany | 210/695 |
| 53-25969 | 3/1978 | Japan | 210/695 |

OTHER PUBLICATIONS

Superfloc data sheet (American Cyanamid).
D. F. Peck et al., "Polymers Plus Magnetic Field Used to Treat Paramagnetic Slurries," *Industrial Wastewater*, Nov. 1969, pp. 5-9.

*Primary Examiner*—Peter Hruskoci
*Assistant Examiner*—Krisanne Shideler
*Attorney, Agent, or Firm*—Haverstock, Garrett and Roberts

[57] ABSTRACT

This invention involves a multi-step, multi-force process for dewatering sludges which have high concentrations of magnetic particles, such as waste sludges generated during steelmaking. This series of processing steps involves (1) mixing a chemical flocculating agent with the sludge; (2) allowing the particles to aggregate under non-turbulent conditions; (3) subjecting the mixture to a magnetic field which will pull the magnetic aggregates in a selected direction, causing them to form a compacted sludge; (4) preferably, decanting the clarified liquid from the compacted sludge; and (5) using filtration to convert the compacted sludge into a cake having a very high solids content.

Steps 2 and 3 should be performed simultaneously. This reduces the treatment time and increases the extent of flocculation and the effectiveness of the process. As partially formed aggregates with active flocculating groups are pulled through the mixture by the magnetic field, they will contact other particles and form larger aggregates.

This process can increase the solids concentration of steelmaking sludges in an efficient and economic manner, thereby accomplishing either of two goals: (a) it can convert hazardous wastes into economic resources for recycling as furnace feed material, or (b) it can dramatically reduce the volume of waste material which must be disposed.

12 Claims, 2 Drawing Sheets

MULTI-STEP PROCESS FOR CONCENTRATING MAGNETIC PARTICLES IN WASTE SLUDGES

GOVERNMENT FUNDING

The research which led to this invention was supported by in part by contract #B-U1538-A-V from Battelle Pacific Northwest Laboratory, as it relates to U.S. Department of Energy contract #DE-AC06-76RLO-1830.

FIELD OF THE INVENTION

This invention is in the field of waste volume reduction, and involves the concentration of solids from liquid flowstreams. More particularly, it involves the concentration of scrubber sludges from steelmaking facilities.

BACKGROUND OF THE INVENTION

Various process have been developed for treating wastewaters to remove suspended solids (i.e, suspended particulate matter, as distinct from dissolved solids such as salt in brine) from the water. Such processes are normally performed so that the treated water can be discharged into a river or other large body of water.

One such process involves the use of chemical flocculating agents. As used herein, the term "flocculant" refers to a chemical agent which is added to a liquid solution (such as a slurry, pulp, or sludge) for the purpose of causing particulate solids that are suspended in the liquid to form chemically bonded aggregates. Flocculants are also called coagulating agents or coagulants by some people. The particles formed by a flocculation reaction are referred to herein as floccules, aggregates, or floc. Since they are enlarged compared to the non-aggregated suspended particles, they settle more quickly in a settling tank, or they can be removed more easily using processes such as centrifugation or vacuum filtration.

One class of flocculents, developed several decades ago, includes certain types of metallic salts such as ferric chloride, ferrous sulfate, aluminum sulfate, etc. Those flocculants hydrolyze and/or ionize suspended solids, thereby causing those solids to react with each other and form aggregates.

Another class of flocculants developed more recently includes long-chain molecules with reactive side groups, such as polyacrylamide. The side-groups react with the solid particles suspended in solution, causing the particles to aggregate. Such flocculants are commercially available, or they can be synthesized using known techniques to have nearly any desired molecular weight, side group type and density, and ionic charge.

Another class of wastewater treatment processes involves the use of magnetic fields. If a magnetic field is applied to an aqueous solution containing particles which are magnetic, it will attract the magnetic particles, causing them to settle more quickly.

Those two processes—chemical flocculation and magnetic attraction—have been combined in various ways to create processes for removing both magnetic and non-magnetic particles from water. For example, U.S. Pat. Nos. 2,232,294 through '296 (Urbain and Stemins, 1941) teach the addition of magnetic powders and flocculants to wastewater, to form magnetic aggregates which are then subjected to magnetic fields to increase their settling rate. U.S. Pat. No. 3,142,638 (Blaisdell and Klaas, 1964) discloses the addition of "weighting agents" (including particulate iron ore) to polluted water along with cationic flocculants, and then subjecting the mixture to a magnetic field. U.S. Pat. No. 4,110,208 (Neal 1978) discloses the use of a flocculant which contains iron atoms to achieve the same effect. US Patent 4,193,866 (Slusarczuk and Brooks, 1980) teaches the use of ferrite powder, a flocculent, and an optional magnetic field to create a magnetic slurry, which can later be regenerated to recover the ferrite powder.

In addition, U.S. Pat. No. 3,536,198 (Bartnik et al, 1970) discloses a settling tank system with an inlet system which causes wastewater to flow through a magnetic unit before it reaches the quiet settling zone. Although the exposure to the magnetic field is brief (one or two seconds), it apparently aligns the particles in a way that promotes flocculation. That system was evaluated and discussed in an article by D. F. Beck and T. J. McBride in *Industrial Waste,* November 1969, pp. 5–9. In addition, German Offenlegungsschrift 26 16 734 (based on UK patent application No. 15756-75, by English Clays Ltd., 1976) discloses the use of a flocculating agent and a magnetic field to create aggregates, then passing the slurry through a magnetized filter.

In a different area, magnetic fields and flocculating agents have also been used in combination to remove magnetic impurities from kaolin clay; see U.S. Pat. No. 3,826,365 (Mercade, 1974).

Most of the prior art in the field of pollution control was developed to treat water which has relatively low concentrations of suspended solids. For example, the article by Peck and McBride involved water containing 600 to 15,000 mg of solids per liter of water; that is 1.5% or less solids by weight. By contrast, the wet scrubbers used to remove particles from blast furnace (BF) off-gases typically create sludges containing up to 25% solids, which would translate into more than 250,000 mg/l The sludges generated by basic oxygen furnaces (BOF) range up to 40% solids. The various types of furnaces and processes used for making steel, and the scrubbers which generate sludges with high solids concentrations, are described in various texts such as *Making, Shaping, and Treating Steel,* 10th edition (1985), published by the Association of Iron and Steel Engineers (Pittsburgh, Pa.)

As used herein, materials which are "generated during steelmaking" includes materials generated during pollution control operations, iron ore mining, and other peripheral operations which are related to the process of making steel. For convenience, the term "sludges" is used broadly herein; it includes slurries, pulps, sludges, and cakes (all are solutions, usually aqueous, that contain varying levels of suspended solids). In common usage, a slurry or pulp is a relatively thin mixture, a sludge is thicker, and a cake is solid or semi-solid, but those classifications are not exact and the term "sludge" is often used for convenience to represent any or all of them.

In efforts to dewater sludges generated during steelmaking, the solids concentration in the sludge represents only the starting point, and the goal is to increase the solids concentration to at least 70% or more, which will convert the sludge into a semi-solid cake having (1) a high metallic content so it can be recycled as feedstock for the steelmaking process, and (2) a low water content so it can be handled and possibly transported economically.

The disposal of semi-solid metallic wastes generated during steelmaking is a substantial problem. Roughly 40 to 50 pounds of dust are generated per tonne (metric ton; 2,200 lbs) of liquid steel. For an annual U.S. steel production of 100 million tons, roughly 2 million tonnes (dry weight) of dust are generated. Currently, most of this waste material is disposed of in landfills, or is held in lagoons. Due to the presence of zinc in those waste products (which results from the use of scrap metal as furnace feed material), most of those steelmaking wastes are classified as toxic and hazardous. Current landfill costs for hazardous wastes range up to $180 per tonne, and that cost is expected to increase dramatically in the future.

Some commercial recycling of steelmaking sludges is carried out, but it is generally limited to sludges having high zinc content, because the zinc makes the process economical, and steps must be taken to reduce the water content before transporting or recycling the waste. To the very limited extent that this is done at all, this dewatering is normally done by vacuum filtration, which can generate cakes having 70–80% solids by weight. Various types of filtering systems have been developed for such use; see, e.g., chapter 19 of Perry and Chilton, *Chemical Engineers Handbook* (McGraw Hill, 1973). However, sludge filtration suffers from various drawbacks. It is time-consuming; the filters clog up quickly, the sludges are difficult to handle and dewater, and it may be difficult to use filtration on a continuous basis. As a result of these and other drawbacks, filtering is not used widely to dewater steelmaking sludges.

The object of this invention is to provide an efficient and economic system for dewatering steelmaking sludges at relatively low cost (including equipment, manpower, operating, and energy requirements).

SUMMARY OF THE INVENTION

This invention involves a multi-step, multi-force process for dewatering sludges which have high concentrations of magnetic particles, such as waste sludges generated during steelmaking. This series of processing steps involves (1) mixing a chemical flocculating agent with the sludge; (2) allowing the particles to aggregate under non-turbulent conditions; (3) subjecting the mixture to a magnetic field which will pull the magnetic aggregates in a selected direction, causing them to form a compacted sludge; (4) preferably, decanting the clarified liquid from the compacted sludge; and (5) using filtration to convert the compacted sludge into a cake having a very high solids content.

Steps 2 and 3 should be performed simultaneously. This reduces the treatment time and increases the extent of flocculation and the effectiveness of the process. As partially formed aggregates with active flocculating groups are pulled through the mixture by the magnetic field, they will contact other particles and form larger aggregates.

This process can increase the solids concentration of steelmaking sludges in an efficient and economic manner, thereby accomplishing either of two goals: (a) it can convert hazardous wastes into economic resources for recycling as furnace feed material, or (b) it can dramatically reduce the volume of waste material which must be disposed.

BRIEF DESCRIPTION OF THE DRAWINGS

FIG. 2, which is divided into

DETAILED DESCRIPTION OF A PREFERRED EMBODIMENT

Figure 1:
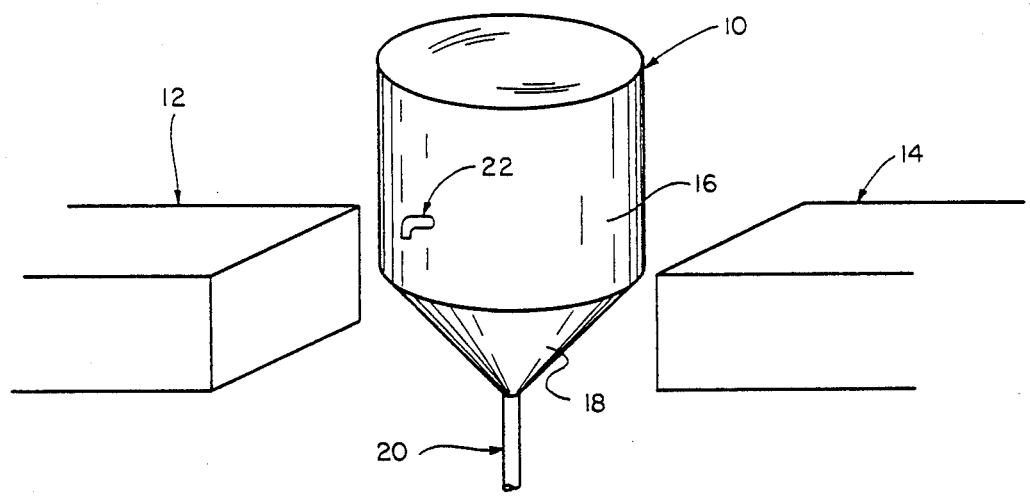
FIG. 1 is a perspective view showing the apparatus of this invention in a scaled-down prototype version.

A preferred embodiment of the apparatus of this invention is depicted in FIG. 1. As shown therein, sludge treatment tank 10 is positioned in a magnetic field, generated by ends 12 and 14 of a permanent magnet. If desired, an electromagnet can be used instead, especially for industrial-scale processing.

Treatment tank 10 comprises vertical wall 16 and, if desired, an optional top wall, which if present should be vented to avoid the creation of a vacuum above the sludge. The external shape of the tank may be any desired configuration, such as circular to minimize stresses on the walls when the tank is full, or square or rectangular to satisfy space constraints if necessary.

A filter layer (not shown in FIG. 1) is placed inside the tank, at or near the bottom of peripheral wall 16. Any suitable filter material can be used, such as wire mesh (which can be magnetized if desired) supported by a structurally reinforced grating or screen. The optimal material, pore size, and thickness of the filter material will depend on the specific characteristics of the sludge being treated. As mentioned earlier, vacuum filtration of steelmaking sludges is currently in limited use, and filter materials suitable for use with the sludges described herein are commercially available.

Tank bottom 18, which is connected to vacuum line 20, can be conically shaped, as is conventional for most tanks that use vacuum filtration. Vacuum line 20 drains water away from the sludge as the sludge forms a cake on top of the filter material inside the tank.

A second outlet 22 can also be provided if desired, to decant supernatant fluid from the tank after the initial settling reaction, before the filtration step.

The tank must be provided with inlet means (not shown in FIG. 1) for the slurry or sludge, and for the flocculant. If desired, the flocculant can be added to the slurry or sludge shortly before the mixture enters the tank, and the turbulence generated as they enter the tank will promote the mixing process. Alternately, the two solutions can be added to the tank separately. If desired, the tank can be equipped with an internal mixing device such as stirring blades.

One preferred sequence of steps used to perform the process of this invention is shown in FIG. 2, a schematic drawing which is divided into four parts. In FIG. 2A, the slurry or sludge and the flocculant are mixed together and put into sludge treatment tank 10. If the inlet mixture is a thin slurry, it can be pretreated before the flocculant is added, by means such as centrifugation in a hydrocyclone, to increase the solids content and remove some of the water, thereby converting it into a thicker sludge.

Figure 2A:
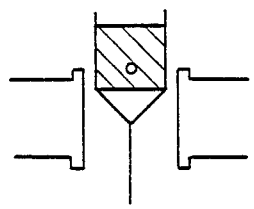
FIGS. 2A through 2D, is a schematic drawing showing a sequence of steps in one preferred embodiment of this invention.
Figure 2B:
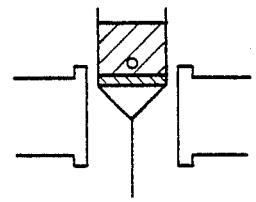

After the slurry or sludge and the flocculant have been mixed, they are allowed to settle in relatively calm conditions, to minimize shearing stresses which would tear apart the floc. This stage is depicted as shown in FIG. 2B. This settling step preferably should occur while the magnetic field is being applied to the mixture, for two reasons First, it reduces treatment time, thereby making better use of the equipment. Second, it increases the extent of flocculation and improves the effectiveness of the combined process. As aggregates are formed, not all of the reactive side groups on the polymeric molecules react immediately with suspended particles. As partially formed aggregates are pulled down through the slurry or sludge by the magnetic field, the induced motion causes them to contact more particles and form larger aggregates.

Most polymeric ionic flocculants will form chemical bonds with magnetic and with non-magnetic particles. The net result is that virtually all of the aggregates will have some degree of magnetic property, and will be pulled downward toward the filter when the magnetic field is applied, thereby increasing the purity of the supernatant.

The optimal strength of the magnetic field, will vary for equipment of different sizes and for sludges having different particle sizes and magnetic characteristics. The magnetic field must be strong enough to exert a substantial downward pull on magnetic particles in the sludge, yet it must not pull those particles down at such a high rate that it will tear apart the aggregates being formed. The optimal magnetic field strength for any specific set of conditions, which will range from several hundred to several thousand gauss, can be determined through routine experimentation, by varying the field strength and measuring the solids content of the supernatant or the compacted sludge over a range of field strengths and settling times.

It is not essential to this invention that the magnetic force exert a downward pull. If desired (for example, if some of the suspended solids have a relatively low density), the magnet can be placed above the tank, and it will cause the magnetic aggregates to float to the surface. Such a flotation process was performed successfully in one laboratory experiment. Alternately, magnetic aggregates can be pulled to one side, in a radial direction (toward the walls or center of a cylindrical tank), or in any other selected direction. As used herein, "compacted" sludge includes sludge that was pulled by a magnetic field in the downward direction, or in any other direction.

Figure 2C:
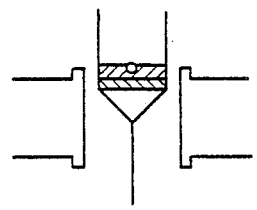

In an optional third step, shown in FIG. 2C, the clarified liquid is decanted through outlet 22, which is positioned vertically so it will remove any liquid above a certain height at or slightly above the upper boundary of the settled sludge. If desired, outlet 22 can be equipped with a vertically adjustable inlet, so the height of the decanting level can be varied between different batches of sludge. The tank can be fitted with a sight glass or an automated monitor (which could measure density, turbidity, viscosity, or other suitable parameters) to allow an operator or an automated control system to determine the height of the sludge after it settles, and to decant any supernatant above that height.

Figure 2D:
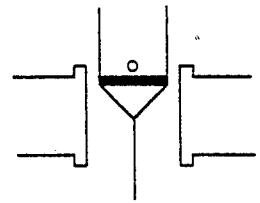

After the decantation step, what remains is a compacted sludge which, in preliminary experiments, contained solids in the range of 45–55%. The compacted sludge is then filtered as shown in FIG. 2D, preferably using vacuum filtration, to further reduce the water content and convert the sludge into a cake. In preliminary experiments, cakes created by the steps of this invention had solids contents in the range of 70–80% by weight, while clear water representing 75–90% of the original volume of the sludge was drawn off. The data are shown in the Tables in the examples below.

Figure 3:
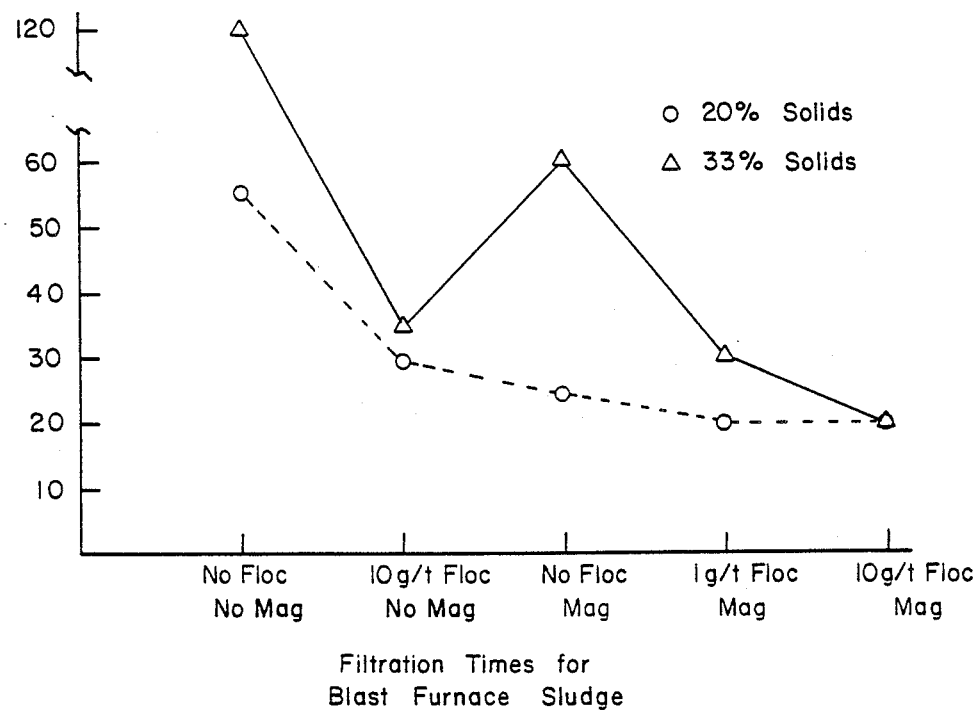
FIG. 3 is a graph which shows the improvement in filtration times provided by this invention, when dewatering sludge from a blast furnace.
Figure 4:
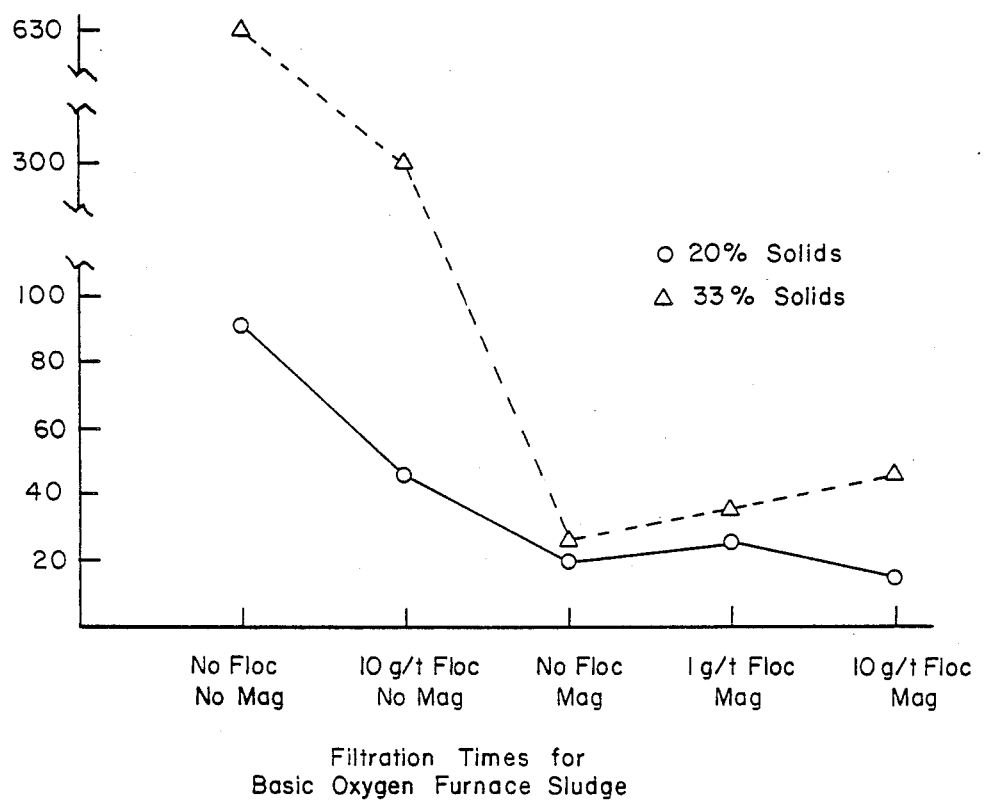
FIG. 4 is a graph which shows the improvement in filtration times provided by this invention, when dewatering sludge from a basic oxygen furnace.

It is possible, using vacuum filtration, to produce cakes having solids in the range of 70–80% by weight, without using the chemical flocculation and magnetic field steps of this invention. However, it is substantially easier and more economical to generate such results by using the steps of this invention. One indicator of this improvement is visually depicted in FIG. 3 and FIG. 4, which shows decreasing filtering time as a function of the steps employed. In the laboratory-scale experiments described in the examples, filtering was stopped when the rate of water removal decreased to one drop per second. As shown in FIG. 3, the filtering time was reduced from 120 seconds to 20 seconds by the use of flocculant in combination with a magnetic field, in treating BF sludge having 33% initial solids. As shown in FIG. 4, the filtering time for treating BOF sludge having 20% initial solids was decreased from 90 seconds to 15 seconds.

EXAMPLES

EXAMPLE 1: TREATMENT OF BLAST FURNACE (BF) SLUDGE

Samples of steelmaking sludges from blast furnaces and basic oxygen furnaces were obtained from the Inland Steel facilities in East Chicago, Ind. Various measurements were made to quantify the solids contents and magnetic characteristics of the sludges and dusts. Due to the high concentration of magnetic particles, the dusts acted uniformly magnetic and had particle sizes almost entirely less than 100 microns. Other relevant data are listed in the Tables.

To standardize the results of the sludge treatment processes, tap water was mixed with high-concentration sludges to standardize their solids contents at either 20% or 33% by weight. Samples of 50 to 60 cc were loaded into plastic filtration vessels (5 cm diameter) for testing.

Each filtration vessel was placed between the parallel faces of a permanent magnet having a circular configuration with an 8 cm gap. The magnetic field strength was about 2000 gauss at 1 cm from either face, and 1600 gauss at the midpoint. Field gradients were approximately 75 gauss/cm in the center of the gap and 200 gauss/cm near the top and bottom of the faces. The filtration vessel was placed in the upper portion of the magnet gap, at a height such that the filter was approximately level with the top of the magnet. The direction of the magnetic pull on the particles in the vessel had a substantial downward component.

An anionic flocculant, Cyanamid Superfloc 204, was mixed with tap water to form a 0.01% solution, which was mixed with the BF or BOF sludge (using a stirring rod) at either of two concentrations, 1 g or 10 g of flocculant per tonne of solid. Cyanamid's sales literature indicates that Superfloc 204 is a highly anionic polyacrylamide with a molecular weight that ranges from 40,000 to 60,000 daltons. Although the exact chemical composition of Superfloc 204 has not been published by Cyanamid, chemical synthesis techniques for creating polyacrylamide flocculants are well-known; see, e.g., chapter 6 in P. Somasundaran, *Fine Particle Processing* (American Institute of Mining Engineers, 1980).

After the mixing operation was completed, each sludge was allowed to settle for 10 seconds. By that time it had settled into a wet cake on top of the filter material in the filtration vessel.

When BF sludges were being treated, there was no decanting step, because the supernatant contained a small but noticeable amount of hydrophobic flocs. If desired, that supernatant could be decanted, and the hydrophobic floc could be removed by conventional wastewater treatment means, such as by filtering the water. Although this would require a separate treatment step for the water, the appropriate water treatment facilities already exist at many steelmaking or municipal water treatment facilities, and such a decanting step would greatly reduce the amount of water that would need to be filtered through the wet cake, which would simplify, speed up, and improve the dewatering of the cake.

After settling, the sludge was filtered through filter paper with a pore size of less than 5 microns, under a vacuum of about 22 inches mercury. The filtrate (the liquid which passed through the filter paper) was very clear, and when analyzed it was found to contain 0.9 micrograms/ml zinc, 0.2 micrograms/ml of iron, and no detectable cadmium, chromium, or lead.

The filtration operation was timed, and was stopped when the filtration rate decreased to one drop per second.

The filtrate and cake were measured, and the results are presented in Tables 1 through 6. Filtration times for blast furnace sludges treated in various ways are shown in FIG. 3. Some data points shown in those tables are average values based on two or three runs; others are based on a single run.

The cake was analyzed and found to consist of 59% iron, 2.7% zinc, 3.4% calcium, and 0.3% lead.

EXAMPLE 2: TREATMENT OF BASIC OXYGEN FURNACE (BOF) SLUDGE

The BOF sludge was treated in a manner identical to the BF sludge treatment described in Example 1, with one exception. Since the supernatant appeared to be very clear, it was decanted after the sludge had settled for 10 seconds in the magnetic field, through a port which had been drilled and plugged in the wall of the filtration vessel.

After decanting, the remaining settled sludge (the "wet cake") was vacuum filtered as described above, and measured. The results are in Tables 1 through 6, and filtration times for various treatments are shown in FIG. 4.

EXAMPLE 3: TREATMENT OF ELECTRIC ARC FURNACE (EAF) DUSTS

The only EAF waste products that were conveniently available were in the form of dusts; however, some EAF facilities generate sludges, and dewatering of those sludges is a significant problem.

Tap water was added to the EAF dusts to create sludges having 9 or 16% solids, which are common for actual EAF sludges. The EAF sludges were treated as described above, including a decanting step. The results are in Table 7.

Those skilled in the art will recognize, or may ascertain using no more than routine experimentation, numerous equivalents to the specific embodiments disclosed herein. Such equivalents are within the scope of this invention.

TABLE 1

Size Analysis and Magnetic Character of BF, BOF, EAF Sludges

| Sample | Weight % −28 microns | Weight % Magnetic |
|---|---|---|
| BF | 54 | 76 |
| BOF | 59 | 84 |
| EAF | 21 | 74 |

TABLE 2

Dewatering Data for BF and BOF Sludges with no Magnetic Field or Flocculant

| | BF | | BOF | |
|---|---|---|---|---|
| Feed Solids (wt %) | 20 | 33 | 20 | 33 |
| Volume of Decant Liquor (cc) | 0 | 0 | 0 | 0 |
| Volume of Filtrate (cc) | 51 | 45 | 55 | 46 |
| Time of Filtration (sec) | 55 | 120 | 90 | 630 |
| Cake Solids (wt %) | 76 | 80 | 74 | 77 |
| Volume Reduction (%) | 88 | 77 | 87 | 76 |

TABLE 3

Dewatering Data for BF and BOF Sludges with 10 g/t Flocculant, but without Magnetic Field

| | BF | | BOF | |
|---|---|---|---|---|
| Feed Solids (wt %) | 20 | 33 | 20 | 33 |
| Volume of Decant Liquor (cc) | 0 | 0 | 0 | 0 |
| Volume of Filtrate (cc) | 52 | 35 | 55 | 48 |
| Time of Filtration (sec) | 30 | 35 | 45 | 300 |
| Cake Solids (wt %) | 80 | 74 | 75 | 77 |
| Volume Reduction (%) | 89 | 74 | 88 | 76 |

TABLE 4

Dewatering Data for BF and BOF Sludges with Magnetic Field, but no Flocculant

| | BF | | BOF | |
|---|---|---|---|---|
| Feed Solids (wt %) | 20 | 33 | 20 | 33 |
| Volume of Decant Liquor (cc) | 0 | 0 | 33 | 31 |
| Volume of Filtrate (cc) | 51 | 47 | 22 | 14 |
| Time of Filtration (sec) | 25 | 60 | 20 | 25 |
| Cake Solids (wt %) | 76 | 76 | 74 | 76 |
| Volume Reduction (%) | 88 | 75 | 88 | 74 |

TABLE 5

Dewatering of BF and BOF Sludges with Magnetic Field and 1 g/t Flocculant

| | BF | | BOF | |
|---|---|---|---|---|
| Feed Solids (wt %) | 20 | 33 | 20 | 33 |
| Volume of Decant Liquor (cc) | 0 | 0 | 44 | 36 |
| Volume of Filtrate (cc) | 52 | 52 | 11 | 13 |
| Time of Filtration (sec) | 20 | 30 | 25 | 35 |
| Cake Solids (wt %) | 80 | 75 | 75 | 76 |
| Volume Reduction (%) | 89 | 76 | 88 | 76 |

TABLE 6

Dewatering of BF and BOF Sludges with Magnetic Field and 10 g/t Flocculant

| | BF | | BOF | |
|---|---|---|---|---|
| Feed Solids (wt %) | 20 | 33 | 20 | 33 |
| Volume of Decant Liquor (cc) | 0 | 0 | 40 | 36 |
| Volume of Filtrate (cc) | 52 | 51 | 16 | 13 |
| Time of Filtration (sec) | 20 | 20 | 15 | 45 |
| Cake Solids (wt %) | 75 | 74 | 76 | 75 |
| Volume Reduction (%) | 87 | 76 | 79 | 75 |

TABLE 7

| Dewatering Data for EAF Dust with Magnetic Field and 1 g/t Flocculant | | |
|---|---|---|
| Feed Solids (wt %) | 9 | 16 |
| Volume of Decant Liquor (cc) | 35 | 30 |
| Volume of Filtrate (cc) | 13 | 15 |
| Time of Filtration (secs) | 15 | 15 |
| Cake Solids (wt %) | 71 | 65 |
| Volume Reduction (%) | 92 | 84 |

I claim:

1. A method of dewatering sludges, comprising the following steps:
   a. mixing a chemical flocculating agent with a sludge generated during steelmaking that contains magnetic particles;
   b. allowing particles in the sludge to form aggregated particles under non-turbulent conditions within a treatment tank positioned in a magnetic field;
   c. subjecting the sludge to the magnetic field which will pull the aggregated particles in a selected direction, causing them to form a compacted sludge;
   d. filtering the sludge through a filter layer placed inside the tank to convert the compacted sludge into a cake having a solids content of at least about 70% by weight.

2. A method of claim 1, wherein supernatant liquid is removed from the compacted sludge in the tank before the compacted sludge is subjected to filtration.

3. A method of claim 2, wherein steps b and c are conducted simultaneously.

4. A method of claim 1, wherein steps b and c are conducted simultaneously.

5. A method of claim 1, wherein the chemical flocculating agent comprises a polymeric molecule with multiple attached reactive side groups, each of the reactive side groups being capable of forming a bond with a particle suspended in a liquid.

6. A method of claim 5 wherein the chemical flocculating agent comprises a polyacrylamide.

7. A method of increasing the solids content of a sludge which contains magnetizable suspended solids, comprising the following steps:
   a. mixing a chemical flocculating agent with the sludge;
   b. allowing particles in the sludge to form aggregated magnetic particles under non-turbulent conditions within a treatment tank positioned in a magnetic field;
   c. subjecting the sludge to the magnetic field which will pull the aggregated magnetic particles in a selected direction, causing them to form a compacted sludge;
   d. filtering the sludge through a filter layer placed inside the tank to convert the compacted sludge into a dewatered cake.

8. A method of claim 7, wherein supernatant liquid is removed from the compacted sludge in the tank before the compacted sludge is subjected to filtration.

9. A method of claim 8, wherein steps b and c are conducted simultaneously.

10. A method of claim 7, wherein steps b and c are conducted simultaneously.

11. A method of claim 7, wherein the chemical flocculating agent comprises a polymeric molecule with multiple attached reactive side groups, each of the reactive side groups being capable of forming a bond with a particles suspended in a liquid.

12. A method of claim 11, wherein the chemical flocculating agent comprises a polyacrylamide.

* * * * *